United States Patent [19]
Ziegler et al.

[11] Patent Number: 5,738,801
[45] Date of Patent: Apr. 14, 1998

[54] HYDROPHOBIC SILICA AEROGELS

[75] Inventors: Bernd Ziegler, Ludwigshafen; Norbert Mronga, Dossenheim; Friedhelm Teich, Mannheim; Günter Herrmann, Heidelberg, all of Germany

[73] Assignee: BASF Aktiengesellschaft, Ludwigshafen, Germany

[21] Appl. No.: 600,929

[22] PCT Filed: Aug. 25, 1994

[86] PCT No.: PCT/EP94/02822

§ 371 Date: Feb. 29, 1996

§ 102(e) Date: Feb. 29, 1996

[87] PCT Pub. No.: WO95/06617

PCT Pub. Date: Mar. 9, 1995

[30] Foreign Application Priority Data

Aug. 31, 1993 [DE] Germany ............................ 43 29 294.1

[51] Int. Cl.$^6$ .............................. F04B 1/74; B01J 21/08; C01B 33/158; C08K 3/36
[52] U.S. Cl. ......................... 252/62; 252/315.6; 423/338; 502/233; 524/493; 524/575.5
[58] Field of Search ................................ 252/62, 315.2, 252/315.6; 423/338; 502/233; 524/493, 575.5

[56] References Cited

U.S. PATENT DOCUMENTS

| 2,093,454 | 12/1937 | Kistler | 423/252 |
| 3,346,507 | 10/1967 | Taulli | 252/315.2 |
| 4,053,435 | 10/1977 | Lynch | 502/330 |
| 4,256,682 | 3/1981 | Denton | 423/338 X |
| 4,610,863 | 9/1986 | Tewari et al. | 423/338 |
| 4,954,327 | 9/1990 | Blount | 423/338 |
| 5,294,480 | 3/1994 | Mielke et al. | 252/305.6 X |

FOREIGN PATENT DOCUMENTS

| 21 03 243 | 8/1972 | Germany . |
| 34 29 671 | 2/1986 | Germany . |
| 39 14 850 | 11/1990 | Germany . |

*Primary Examiner*—Richard D. Lovering
*Attorney, Agent, or Firm*—Oblon, Spivak, McClelland, Maier & Neustadt, P.C.

[57] ABSTRACT

Hydrophobic silica aerogels obtainable by reacting a waterglass solution with an acid at a pH of from 7.5 to 11, substantially removing ionic constituents from the resulting silica hydrogels by washing with water or dilute aqueous solutions of inorganic bases, while the pH of the hydrogels is kept in the range from 7.5 to 11, displacing the aqueous phase contained in the hydrogel by an alcohol, and subsequent supercritical drying of the resulting alcogels.

21 Claims, No Drawings

HYDROPHOBIC SILICA AEROGELS

This application is a 371 of PCT/EP 94/02822 filed Aug. 25, 1994 which is based on Fed. Rep. Germany P 4329294.1 filed Aug. 21, 1993.

BACKGROUND OF THE INVENTION

1. Field of the Invention

The present invention relates to novel hydrophobic silica aerogels obtainable by reacting a waterglass solution with an acid at a pH of from 7.5 to 11, substantially removing ionic constituents from the resulting silica hydrogel by washing with water or dilute aqueous solutions of inorganic bases, while the pH of the hydrogel is kept in the range from 7.5 to 11, displacing the aqueous phase contained in the hydrogel by an alcohol, and subsequent supercritical drying of the resulting alcogel.

The invention furthermore relates to the preparation of these aerogels and to the use thereof as thermal insulating material, as support material for catalysts and as additive in rubber.

2. Description of the Related Art

Silica aerogels are outstandingly suitable, because they have only low thermal conductivity, as thermal insulating material. As is known, they are obtainable, for example, by precipitating silica from waterglass using an acid, washing the ionic constituents out of the hydrogel formed, displacing the water by a lower-boiling, water-soluble organic liquid, especially an alcohol such as methanol, heating the resulting "alcogel" containing the alcohol under supercritical pressure to a temperature above the critical temperature of the organic liquid and removing the liquid by flash evaporation at the supercritical temperature. If required, the water-soluble liquid can be replaced, before this supercritical drying, by a water-insoluble organic liquid or else liquid carbon dioxide (US-A-2 093 454, DE-A 34 29 671).

The large-volume and large-pore silica aerogel produced in this drying process can be converted into powder form by milling. A special method for producing small aerogel particles comprises, according to DE-A 21 03 342, spraying waterglass and acid from a mixing nozzle, which results in drop-shaped particles.

The aerogels prepared by the known processes must also be subjected to a subsequent treatment to render them hydrophobic because otherwise they show a drastic deterioration, owing to a rapid onset of uptake of water, in their insulation properties.

Normally used for this purpose are organosilicon compounds, silanes and chlorosilanes, with which the dry gel is treated in the gas phase or which may also be present even during the precipitation or supercritical drying. However, these water repellents are costly, and when chlorosilanes are used it is necessary to remove and neutralize the hydrogen chloride produced.

SUMMARY OF THE INVENTION

It is an object of the present invention to provide hydrophobic silica aerogels which can be prepared in a simple and economic manner.

We have found that this object is achieved by hydrophobic silica aerogels which are obtainable by reacting a waterglass solution with an acid at a pH of from 7.5 to 11, substantially removing ionic constituents from the resulting silica hydrogel by washing with water or dilute aqueous solutions of inorganic bases, while the pH of the hydrogel is kept in the range from 7.5 to 11, displacing the aqueous phase contained in the hydrogel by an alcohol, and subsequent supercritical drying of the resulting alcogel.

DESCRIPTION OF THE PREFERRED EMBODIMENTS

We have also found the process defined hereby for preparing these aerogels.

Last but not least, we have found the use of these aerogels as thermal insulating material, as support material for catalysts and as additive to rubber.

The hydrogels which are used as starting materials for the silica aerogels can advantageously be prepared from alkali metal waterglass, especially sodium waterglass. This entails a waterglass solution, which is normally from 10 to 30, preferably 12 to 20, % by weight, being mixed homogeneously with a dilute acid, in particular a mineral acid, preferably sulfuric acid, so that the pH of the mixed product is adjusted to, as a rule, from 7.5 to 11, preferably 8 to 11, particularly preferably 8.5 to 10, very particularly preferably 8.5 to 9.5. It is particularly beneficial to use for this purpose, as described in DE-A 21 03 243, a mixing nozzle from which the sol is sprayed and solidifies, during the flight through the air, to hydrogel droplets.

It is, of course, also possible; for example, to produce molded hydrogel articles by mixing waterglass and acid in a suitable mold and subsequently allowing the gelling to take place.

It is furthermore possible for the hydrogels to contain pigments, as described in DE-A 39 14 850, in which case particularly suitable pigments are those which scatter, absorb or reflect infrared radiation of wavelength 3 to 10 μm.

The resulting gel is then preferably washed with water until free of salts, during which the pH of the hydrogel scarcely changes and virtually corresponds to the value adjusted in the mixed product. However, it is also possible to add to the washing water inorganic bases such as sodium hydroxide solution or ammonia. In this case, care must be taken that the hydrogel still has a pH in the abovementioned range from 7.5 to 11, preferably 8.5 to 10, particularly preferably 9 to 10, after the washing. It is therefore as a rule unsuitable to add acids to the washing water.

It is expedient to continue the washing until the conductivity of the washing water which drains off is about 20–300, preferably 50–150, μs/cm. This corresponds to an alkali metal (sodium) content of the hydrogel of, as a rule, from 0.1 to 1.7, preferably 0.4 to 1.3, % by weight, determined on a sample dried under water pump vacuum at 80° C.

The aqueous phase present in the hydrogel is virtually completely displaced, ie. until the water content of the organic phase which drains off is, as a rule, <0.2, preferably <0.1, % by volume, by an alcohol. This liquid exchange preferably takes place in a continuous flow apparatus. The exchange can also take place under pressure. The exchange is normally carried out at room temperature, but the mixture of hydrogel and alcohol can also be heated up to 50° C.

DESCRIPTION OF THE PREFERRED EMBODIMENTS

Suitable alcohols for the water exchange are $C_1$–$C_5$-alcohols, especially $C_3$–$C_5$-alcohols, and preferred alcohols are those which cannot be oxidized to aldehydes, ie. secondary and tertiary alcohols. In addition, the alcohols should have favorable critical data for the drying. Particular examples which may be mentioned are isobutanol, tertbutanol, sec-pentanol and tert-pentanol and, in particular, isopropanol. Besides monohydric alcohols, mention may also be made of polyhydric alcohols such as ethylene glycol and glycerol.

The subsequent supercritical drying can be carried out in a conventional way by subjecting the alcogel together with excess alcohol in a pressure vessel to conditions which are supercritical for the particular alcohol (ie. for example for isopropanol to a temperature of about 240°–280° C. and a pressure of about 55–90 bar), ie. the pressure vessel is heated to a supercritical temperature while limiting the pressure. The alcohol is then removed by decompression, preferably isothermal decompression, preferably gradually by slightly opening the pressure valve.

The silica aerogels according to the invention are distinguished by advantageous properties. In particular, besides good thermal insulation properties, they show only a very small tendency to take up water.

They can be prepared in a simple manner by the process according to the invention, it being possible to dispense with the use of costly hydrophobing reagents.

They are therefore suitable and particularly advantageous for thermal insulation, in which case they can be used both as sole insulating material and as basic material for thermally insulating composite materials, and as support material, eg. for catalysts.

They can be used either as granules (usual particle sizes from 1 to 8 mm) or after previous milling as powders (particle sizes <1 mm).

The silica aerogels according to the invention are, especially when they are in the form of a powder, suitable and advantageous as substitute for pyrogenic or highly disperse silicas which are produced in an elaborate manner by decomposing tetrachlorosilane in an oxyhydrogen flame. Examples of suitable uses which may be mentioned are plastics, especially including natural and synthetic rubbers (eg. for automobile tires), adhesives, colors, paints, pharmacy, cosmetics, the papermaking, textile, mineral oil and fiber industries, and glassmaking, pyrotechnics and foundry work, where the aerogels display versatile effects as dispersants, boosters, flowability aids, flotation aids, fillers, antifoams and/or absorbers. If the applications are in the presence of water it is also possible, of course, for the aerogels to be used, after a subsequent thermal treatment to render them hydrophilic, for these purposes, and they are thus also available as favorable material for these uses.

A) Preparation and testing of a hydrophobic silica aerogel

EXAMPLE 1

45.7 l/h 13% by weight waterglass solution (prepared by diluting an industrial waterglass solution containing 27% by weight $SiO_2$ and 8% by weight $Na_2O$ with water) and 6 l/h 23% by weight sulfuric acid were combined in a mixing nozzle as described in DE-A 21 03 243 at 20° C. and 2.5 bar. The unstable hydrosol which was formed by continuous neutralization of the waterglass solution in the mixing chamber had a pH of 8.1±0.1 and was sprayed after a holdup time of 0.1 s through the nozzle orifice (2 mm diameter). The jet of liquid disintegrated during the flight through the air into individual drops which solidified, before reaching the water tank, to transparent mechanically stable hydrogel beads.

The hydrogel was washed with deionized water until the washing liquid which drained off had an electrical conductivity of ≦110 μS/cm and a pH of 9.8±0.1. The sodium content of a sample of the hydrogel dried under water pump vacuum at 80° C. was 1.1% by weight.

The water present in the hydrogel was then replaced by isopropanol. For this purpose, 2000 g of hydrogel were placed in a 5 l vessel which was completely filled with isopropanol. Isopropanol was pumped through the vessel at 25° C. until the water content of the isopropanol which drained off was <0.1% by volume. A total of 8 l of isopropanol was required for this.

For the supercritical drying, the resulting alcogel was placed together with 10 l of isopropanol in a pressure vessel with a volume of 20 l and heated to 270° C. over the course of 5 h, during which the pressure was limited at 90 bar. Isothermal decompression was then carried out over the course of 60 min.

The cooled product was removed and then dried at 80° C. and 200 mbar for about 2 h.

The resulting silica aerogel was in the form of granules with a particle size distribution from 1 to 8 mm. Half of it was converted into a powder by milling with glass beads for 5 hours.

The characteristic data of apparent density ρ [kg/m³] (based on ISO 3944), BET specific surface area [m²/g], thermal conductivity $\lambda_{10}$ [W/m·K] by the DIN 52 616 method and water uptake (% by weight) after storage in a desiccator at 25° C. and a relative humidity of 95% for 20 d are compiled in Table 1 for the granules and the powder.

COMPARATIVE EXAMPLE 1

For comparison, a silica aerogel was prepared as in Example 1 of DE-A 39 14 850, with the hydrogel formation taking place at a pH of 7.1±0.1.

The characteristic data of this aerogel are likewise listed in Table 1.

TABLE 1

|  | ρ [kg/m³] | Spec. surface area [m²/g] | $\lambda_{10}$ [W/m · K] | Water uptake [% by weight] |
| --- | --- | --- | --- | --- |
| Granules | 110 | 365 | 0.023 | 1.6 |
| Powder | 110 | 380 | 0.028 | 1.4 |
| Comparative | 140 | 436 | 0.024 | 38.6 |

B) Use in natural rubber

EXAMPLE 2

The silica aerogel prepared as in Example 1 was milled (average particle size 60 μm, particle size distribution from 1 to 400 μm) and then incorporated into natural rubber in a two-roll mill at 60° C.

The mixture had the following composition:

100 parts by weight of natural rubber (ribbed smoked sheets quality 1 from Weber+Schaer, Hamburg)

1.5 parts by weight of polyethylene glycol (Pluriol® E 9000,BASF)

2 parts by weight of PE light stabilizer wax (Antilux® 500, Rheinchemie)

2 parts by weight of phenolic antiaging agent (Vulkanox® BKF, Bayer)

5 parts by weight of zinc oxide as activator 1.5 parts by weight of stearic acid as activator 2.5 parts by weight of sulfur (5% coated; Struktol® SU 95, Schill+Sailacher)

1.25 parts by weight of mercaptobenzothiazole accelerator (Vulkacit® DM/C, Bayer)

0.5 part by weight of diphenylguanidine accelerator (Vulkacit D)

30 parts by weight of aerogel powder

The characteristic data of the mixture, the vulcametry reaction time [min] by the DIN 53 529 method, temperature after processing [°C] and tear strength [N/mm²] by the DIN 53 504 method, Shore A hardness by the DIN 53 505 method and viscosity [Mooney Units, MU] by the DIN 53 523 method, are compiled in Table 2.

COMPARATIVE EXAMPLE 2

A rubber mixture was produced as in Example 2 using conventional pyrogenic silica with a BET surface area of 200 m²/g.

The characteristic data of this mixture are likewise listed in Table 2.

TABLE 2

|  | Example 2 | Comparative Example 2 |
| --- | --- | --- |
| Reaction time [min] | 17.4 | 42.8 |
| Temperature after processing [°C.] | 80 | >100 |
| Tear strength [N/mm²] | 20.3 | 15.0 |
| Shore A hardness [. . .] | 57.4 | 59.7 |
| Viscosity [MU] | 89.9 | 76.1 |

We claim:

1. A hydrophobic silica aerogel obtained by reacting a water-glass solution with an acid at a pH of from about 7.5 to 11, substantially removing ionic constituents from the resulting silica hydrogel by washing with water or dilute aqueous solutions of inorganic bases, while the pH of the hydrogel is kept in the range of from about 7.5 to 11, displacing the aqueous phase contained in the hydrogel by isopropanol, and subsequently supercritically drying the resulting alcogel.

2. The hydrophobic silica aerogel of claim 1, wherein said water-glass solution is an alkali metal water-glass solution.

3. The hydrophobic silica aerogel of claim 1, wherein said acid is a mineral acid.

4. The hydrophobic silica aerogel of claim 3, wherein said mineral acid is sulfuric acid.

5. The hydrophobic silica aerogel of claim 1, wherein said water-glass solution is reacted with said acid at a pH of about 8.5 to 10.

6. The hydrophobic silica aerogel of claim 5, wherein said water-glass solution is reacted with said acid at a pH of about 8.5 to 9.5.

7. The hydrophobic silica aerogel of claim 1, wherein the pH of the hydrogel is maintained in a range of about 8.5 to 10.

8. The hydrophobic silica aerogel of claim 1, wherein said aqueous phase is displaced by isopropanol until a water content of <0.2% by volume is obtained.

9. The hydrophobic silica aerogel of claim 1, wherein said supercritical drying of the alcogel is effected at a temperature of about 240° to 280° C. and a pressure of about 55 to 90 bar.

10. A thermal insulating composite material, comprising (a) a support (b) the silica aerogel of claim 1.

11. A supported catalyst, comprising (a) a catalyst and (b) the silica aerogel of claim 1.

12. A rubber composition, comprising (a) rubber and (b) the silica aerogel of claim 1.

13. A process for preparing a hydrophobic silica aerogel, which comprises:

a) reacting a water-glass solution with an acid at a pH of from about 7.5 to 11;

b) substantially removing ionic constituents from the resulting silicon hydrogel by washing with water or dilute aqueous solutions of inorganic bases, while the pH of the hydrogel is kept in the range of from about 7.5 to 11;

c) displacing the aqueous phase contained in the hydrogel by isopropanol; and d) subsequently supercritically drying the resulting alcogel.

14. The process of claim 13, wherein said water-glass solution is an alkali metal water-glass solution.

15. The process of claim 13, wherein said acid is a mineral acid.

16. The process of claim 15, wherein said mineral acid is sulfuric acid.

17. The process of claim 13, wherein said water-glass solution is reacted with said acid at a pH of about 8.5 to 10.

18. The process of claim 17, wherein said water-glass solution is reacted with said acid at a pH of about 8.5 to 9.5.

19. The process of claim 13, wherein the pH of the hydrogel is maintained in a range of about 8.5 to 10.

20. The process of claim 13, wherein said aqueous phase is displaced by isopropanol until a water content of <0.2% by volume is obtained.

21. The process of claim 13, wherein said supercritical drying of the alcogel is effected at a temperature of about 240° to 280° C. and a pressure of about 55 to 90 bar.

* * * * *